United States Patent [19]

Smock et al.

[11] Patent Number: 5,655,750

[45] Date of Patent: Aug. 12, 1997

[54] PLASTIC INLET APPLIANCE WATER VALVE

[75] Inventors: Steven William Smock, Indianapolis; Neil Edward Grah, Plainfield; Michael Roy DuHack, Indianapolis, all of Ind.

[73] Assignee: Emerson Electric Co., St. Louis, Mo.

[21] Appl. No.: 413,734

[22] Filed: Mar. 30, 1995

[51] Int. Cl.$^6$ .................................................. F16L 5/00
[52] U.S. Cl. ........................ 251/148; 285/64; 285/341
[58] Field of Search ............................ 251/148; 285/64, 285/90, 341

[56] References Cited

U.S. PATENT DOCUMENTS

| | | |
|---|---|---|
| 3,501,177 | 3/1970 | Jacobs . |
| 3,888,521 | 6/1975 | O'Sickey . |
| 4,298,222 | 11/1981 | Davies . |
| 4,558,844 | 12/1985 | Donahue, Jr. . |
| 4,697,608 | 10/1987 | Kolze et al. . |
| 4,889,316 | 12/1989 | Donahue, Jr. . |
| 5,082,240 | 1/1992 | Richmond . |
| 5,385,330 | 1/1995 | Joseph ........................ 251/148 |
| 5,419,363 | 5/1995 | Robinson .................... 251/148 X |

OTHER PUBLICATIONS

U.S. application No. 08/395,274, Smock et al., filed Feb. 27, 1995.
Jaco Product Brochure,Vibra Pruf Tube Fittings (Jan 1, 1986).
California Environmental Protection Agency, Office of Environmental Hazard Assessment, The Implementation of Proposition 65: A Progress Report (Apr., 1993).
California Code Chapter b.b, Safe Drinking Water And Toxic Enforcement Act of 1986.
California Environmental Protection Agency, Office of Environmental Health Hazard Assessment, Safe Drinking Water And Toxic Enforcement Act of 1986, Chemicals Known To The State To Cause Cancer Or Reproductive Toxicity, p. 5.

*Primary Examiner*—Kevin Lee
*Attorney, Agent, or Firm*—Eric R. Waldkoetter; Mark D. Becker

[57] ABSTRACT

An apparatus and method for connecting a residential water line to a household appliance, solenoid controlled, inlet water valve such as that used on a refrigerator freezer icemaker is disclosed. A residential water line, typically a 0.25 inch (0.635 cm) diameter copper or plastic line, is connected to an all plastic inlet connector. The inlet connector has an integral O-ring seat. A gripper nut that is designed to cooperate with an O-ring and the O-ring seat is slipped over the water line. The water line is positioned against a shoulder in the inlet connector that properly positions the water line. The gripper nut is tightened to compress the O-ring, and seal and fix the water line in the inlet connector.

23 Claims, 14 Drawing Sheets

PRIOR ART

28P

28P

PLASTIC INLET APPLIANCE WATER VALVE

BACKGROUND

This invention relates to water valves and more specifically to solenoid operated inlet water valves used on household appliances.

Inlet water valves have been used on household appliances such as ice makers, dishwashers, and clothes washers for many years to control the flow of water into the appliance. Inlet water valves are typically attached to the appliance with an inlet connector attached with a union connector to a water source pipe, and the inlet water valve outlet is connected to the appliance. A solenoid operated by the appliance actuates a valve to permit or stop water flow into the appliance. The solenoid can either directly actuate the valve or can operate a pilot valve to actuate the valve.

The manufacturing of inlet water valves has become increasingly competitive and the most desirable inlet water valve designs have the fewest parts and the fewest manufacturing steps. The use of fewer parts and fewer manufacturing steps generally results in decreased cost and increased quality. Also, new regulations such as California Proposition 65 may require removal of all lead, including the small amount that almost all brass contains for machining purposes, from all home appliances that contact potable water. Another concern of appliance manufacturers is to have an inlet valve that is easy to connect to a water source pipe using as few tools as possible.

Some prior art water valves 20P, such as shown in FIGS. 1, 2, and 3, have inlet connectors 22P, that are brass. A brass plate 24P is attached to the water valve inlet 26P and a brass elbow 28P is screwed into the brass plate 24P to provide an inlet connector 22P. Brass inlet connectors are expensive to manufacture. Additionally, lead contained in the brass inlet connector can leach into water used by the appliance.

Some prior art inlet connectors have a connector insert that is fixed in the inlet connector and the water source pipe is attached to the connector insert. Connector inserts are often made of brass because of its anti-corrosion properties and strength. Also some prior art valves use a brass insert in a plastic inlet connector and a brass compression fitting to attach the water source pipe. An example of a plastic inlet connector with a brass insert and compression fitting is disclosed in U.S. Pat. No. 4,697,608 issued to Kolze et al.

Some prior art water valves, such as shown in FIG. 4, inlet connectors do not have a connector insert but are configured instead to accept a garden hose style connector. Although this reduces components compared to inlet connectors 32P with connector inserts, garden hose connectors have a tendency to leak because a portion of the connector is typically soldered. During the life of the appliance, vibration can cause this solder joint to crack and leak water. Additionally, solder typically contains lead which will be discouraged or prohibited in consumer appliances dispensing drinking water under laws such as California Proposition 65, The Safe Drinking Water and Toxic Enforcement Act of 1986.

For the foregoing reasons, there is a need for an inlet water valve connector that does not contain brass, contains fewer parts, eliminates the need for a union connector, is more reliable, is less expensive to produce, reduces the number of rejected parts for failure to meet quality standards, less likely to leak compared with a garden hose style connector, and can be configured with an exit angle that reduces the need for a water source pipe to make tight bends.

SUMMARY

We have invented an apparatus and method that satisfies the need for an appliance water valve with an all plastic integral inlet connector angled from about 30–90 degrees to the inlet. The plastic inlet appliance water valve comprises the following. A water source pipe which supplies water to the appliance. A valve body having an inlet that controls the input of water from the water source pipe to the appliance. A frame for attaching the valve body to the appliance and the frame is shaped to protect the plastic inlet connector from damage. A gripper nut used to attach the water source pipe to the water valve. A plastic inlet connector having an O-ring seat attached to the inlet for receiving the water source pipe and a shoulder that is integral to the plastic inlet connector for properly positioning the water source pipe.

The method for attaching a water source pipe to an appliance water valves, comprises the following steps. A water source pipe is provided to the appliance water plastic inlet appliance water valve. A plastic inlet connector is provided that is attached to the water valve body having an inlet orifice for receiving the water source pipe, a threaded connector surrounding the inlet orifice and an O-ring seat near an upstream periphery of the inlet orifice. Double O-rings are provided to rest on the O-ring seat, the two O-rings are separated by a washer. A gripper nut is also provided having a compression ring, a gripper, and threads that cooperate with the threaded receptacle for attaching the gripper nut to the plastic inlet connector and a nut bore sized to accept the water source pipe.

The gripper nut threads are engaged on the threaded connector surrounding the inlet orifice. The water source pipe is inserted through the gripper nut bore, through the double O-rings, and into the inlet orifice until the water source pipe rests on a shoulder on the downstream end of the inlet orifice. The gripper nut is then tightened causing the compression ring to apply pressure to the O-rings, and compress them as they rest in the O-ring seat. A seal is formed between the inlet orifice and the water source pipe by the O-rings compression against the inlet orifice and the water source pipe. Also, as the gripper nut is tightened, the water source pipe is gripped by the gripper that is angled to wedge the water source pipe in the inlet orifice.

The following are objects of the invention. Meet anticipated regulatory requirements to eliminate parts containing lead, e.g. brass, in household appliances using potable water by providing an all plastic inlet that eliminates the need for brass fittings which can contain lead. Decrease the manufacturing costs and increase quality by reducing the number of manufactured parts required to produce an appliance inlet water valve. Eliminate the need to use a union connector to attach the water source pipe to the inlet connector. Create an easier way to install an appliance inlet water valve by allowing the water source pipe to attach to the inlet connector with minimal use of tools. Eliminate leaks caused by garden hose connector broken solder joints on appliance inlet water valves by eliminating garden hose connectors. Decrease water source pipe kinks and obstructions by having the inlet connector make up to a 90 degree bend, if necessary, rather than bending the water source pipe. Decrease water inlet flow noise caused by cavitation. Eliminate leakage that can occur around a brass insert or brass insert gasket in the inlet connector by eliminating the need for a brass insert.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1:
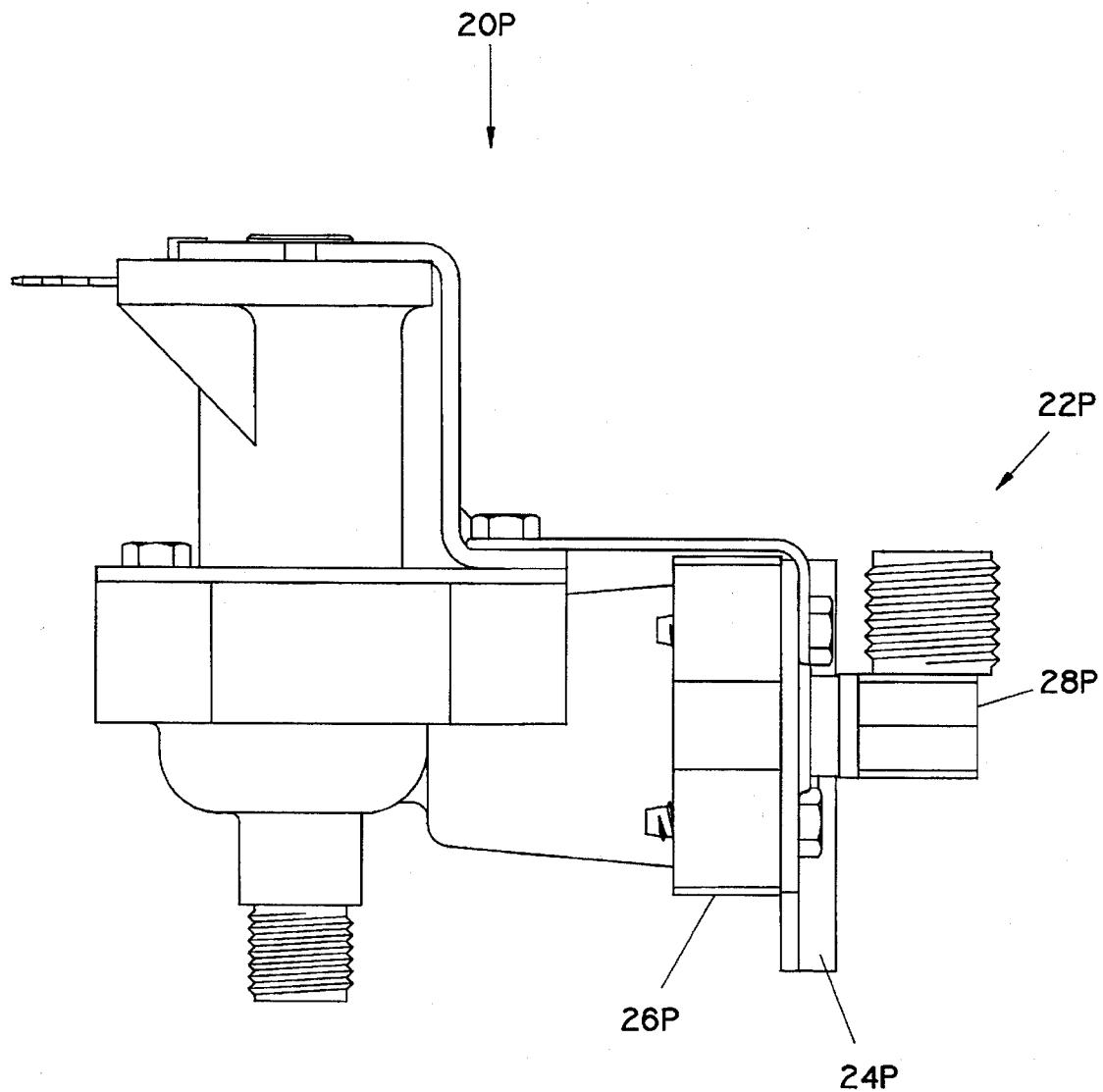
FIG. 1 shows a prior art inlet water valve with a brass inlet connector.
Figure 2:
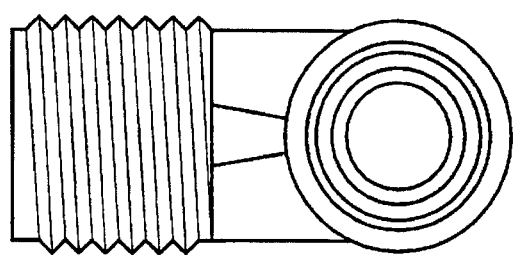
FIG. 2 shows a prior art brass inlet elbow.
Figure 3:
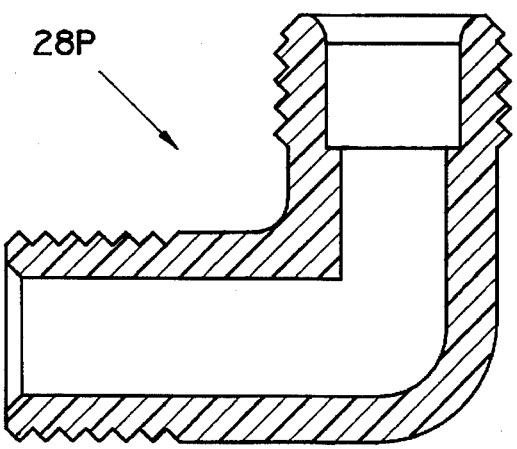
FIG. 3 shows another view of the prior art brass inlet elbow.
Figure 4:
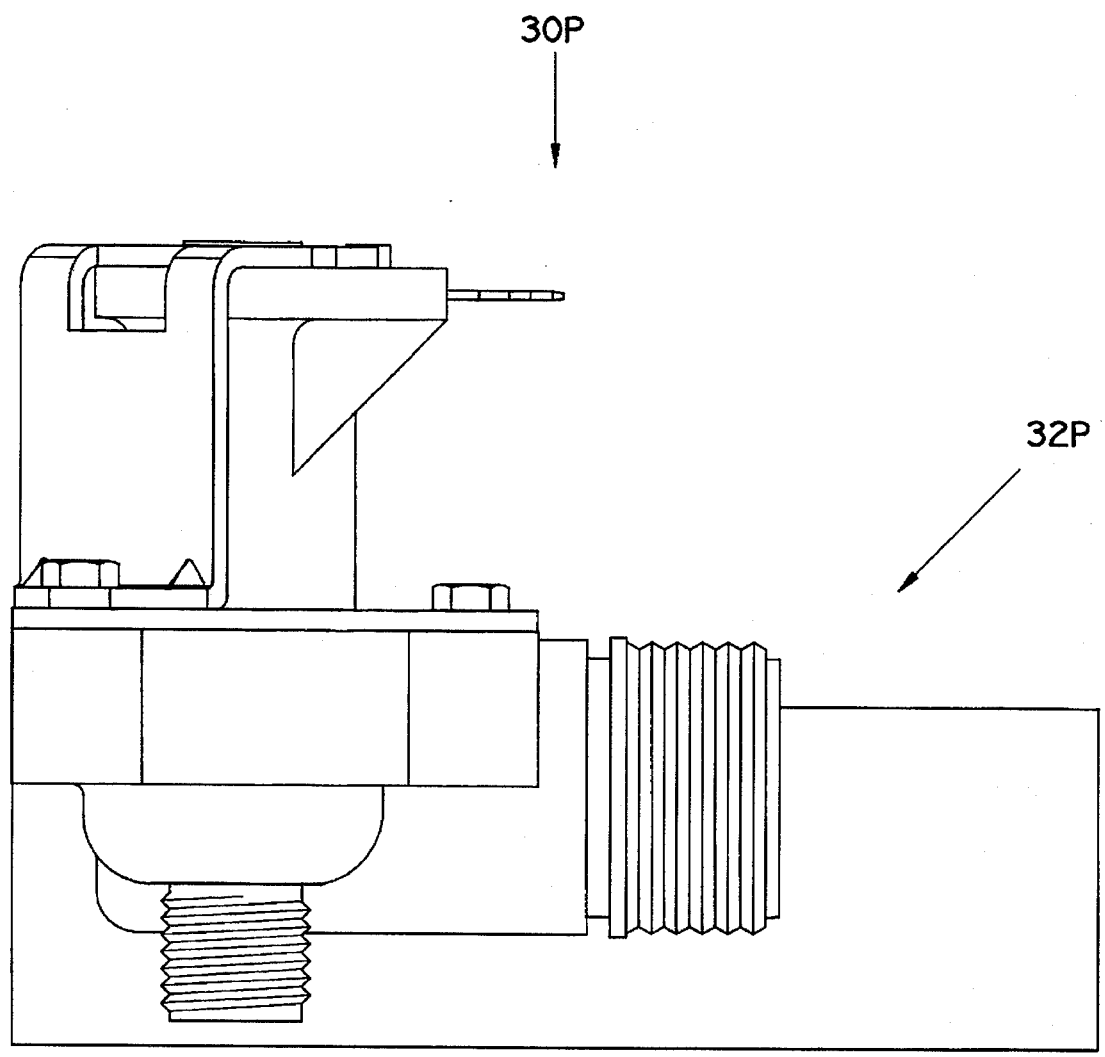
FIG. 4 shows a prior art inlet water valve with a garden hose inlet connector.
Figure 5:
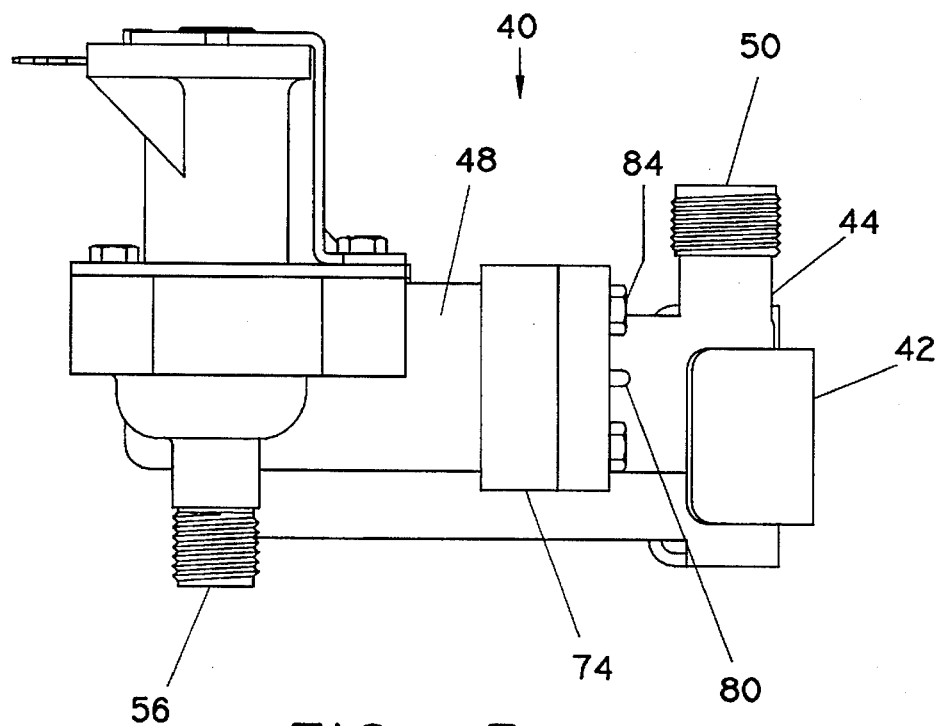
FIG. 5 shows an inlet water valve with a plastic inlet connector.
Figure 6:
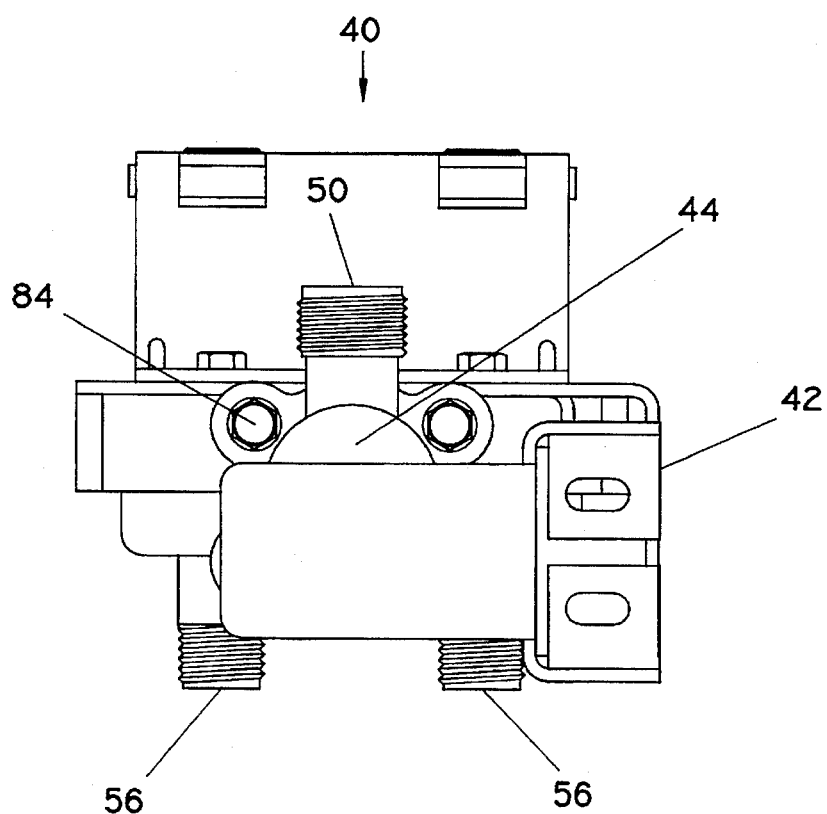
FIG. 6 shows another view of the inlet water valve with the plastic inlet connector.
Figure 7:
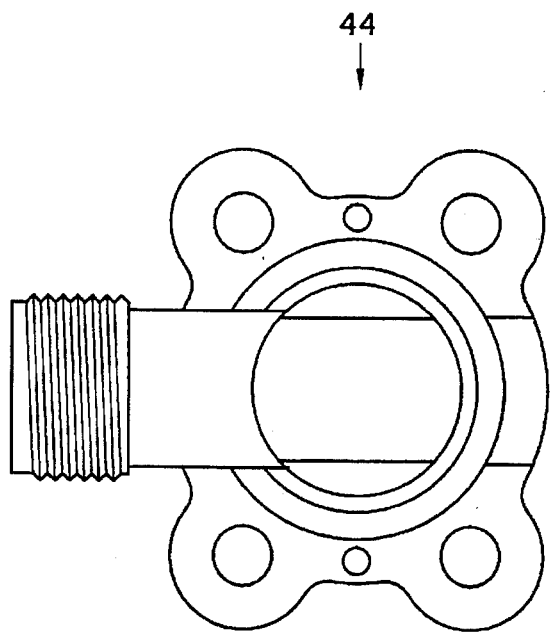
FIG. 7 shows an exterior view of the plastic inlet connector.
Figure 8:
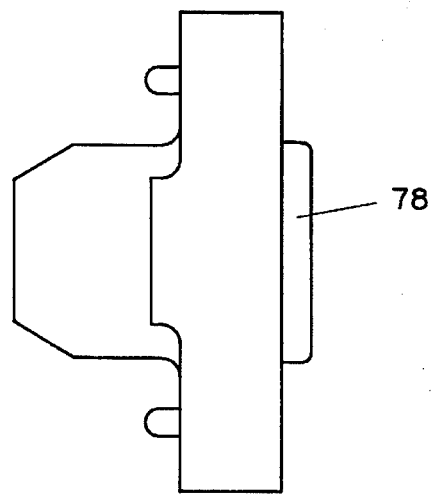
FIG. 8 shows a view of the plastic inlet connector opposite an inlet orifice.

Referring to FIGS. 5 and 6, an appliance inlet water valve 40 of the type typically found in a refrigerator freezer ice maker is shown. The water valve 40 is typically attached to the back or bottom of the refrigerator with a metal frame 42 and a water source pipe 46 (FIG. 13) is run from a residential water line to the water valve inlet connector 44.

Figure 9:
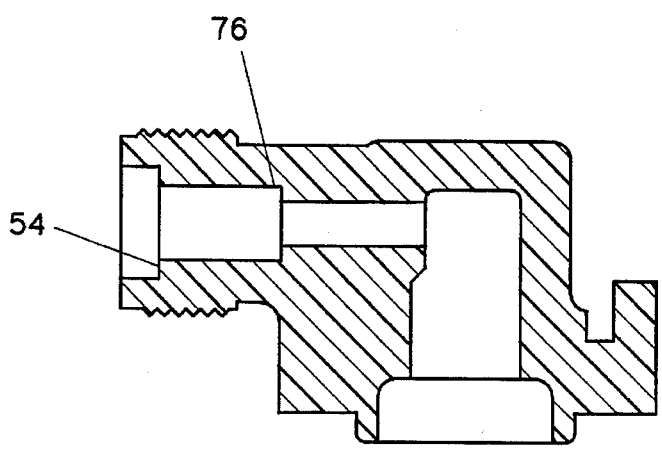
FIG. 9 shows a sectioned view of the plastic inlet connector.

An appliance water valve 40, having features of the invention, comprises: a water source pipe 46 for supplying water to the appliance; a valve body 48 having an inlet 74 controlling the input of water from the water source pipe 46 to the appliance; a gripper nut 52 (FIG. 13) for attaching the water source pipe 46 to the water valve 40; a plastic inlet connector 44 having an integral O-ring seat 54 (FIG. 9) attached to the inlet connector 44 for receiving the water source pipe 46 and gripper nut 52; O-rings 55 (FIG. 13) to provide a water-tight seal; and a washer 58 (FIG. 13) to separate the O-rings 55.

The water source pipe 46 found in a residential house can take a variety of forms such as a plastic or copper pipe with a diameter of typically 0.25 inches (0.635 cm). Water source pipes 46 are often located in areas that are not out in the open such as under sinks, in kitchen corners, and behind refrigerators which may be dark and cramped. In such spaces maneuvering tools can be difficult.

The valve body 48 having an inlet connector 44 is molded preferably from a plastic such as a Food and Drug Agency (FDA) grade polypropylene. The valve body 48 in addition to the inlet connector 44 has a valving cavity, a guide tube, an armature, field windings, a diaphragm, a diaphragm insert (not shown), and an outlet 56. A metal frame 42 is attached to the valve body 48 for mounting the water valve 40 to the appliance, supplying an electrical ground connection, and for protecting the inlet connector 44 from damage. The plastic inlet connector 44 often extends beyond the back of an appliance such as on a refrigerator to facilitate connection of the water source line 46 to the plastic inlet connector 44 by the customer or installer. Since the plastic inlet connector 44 may not be protected by the appliance cabinet (not shown), the plastic inlet connector 44 can be damaged when moving an appliance or during appliance installation. The water valve metal frame 42 is typically constructed of a 14 gauge 1008/1010 cold rolled steel and shrouds the plastic inlet connector 44 on three sides to protect the plastic inlet connector 44 from damage.

Referring to FIGS. 11–13, 22A–C, and 23, additional protection for the plastic inlet connector 44 can be provided with a contoured metal frame 100. The contoured metal frame 100 comprises alignment holes 102, screw holes 104, a mount 106, and a ground wire 108. The contoured metal frame 100 is aligned on the plastic inlet connector 44 with alignment holes 102 that engage alignment bosses 80 on the plastic inlet connector 44. The ground wire 108 electrically connects the armature ground to the mount 106 which is then electrically connected an appliance (not shown). Once the contoured metal frame 100 is aligned, the contoured metal frame 100 is attached to the plastic inlet connector 44 with four screws 84. The four screws 84 also attached the plastic inlet connector 44 to the inlet 74. The contoured metal frame 100 is manufactured from a material similar to that used for the metal frame 42 (FIG. 5).

The contoured metal frame 100 protects the plastic inlet connector 44 from lateral force of at least one hundred pounds (45.36 Kg) that can be inadvertently applied when the water source pipe 46 is installed on the plastic inlet connector 44. When a lateral force is applied to the plastic inlet connector 44, the plastic inlet connector 44 flexes and then the contacts the contoured metal frame 100. Since the contoured metal frame 100 is much more rigid than the plastic inlet connector 44, the contoured metal frame greatly reduces plastic inlet connector 44 flexing once the plastic inlet connector 44 contacts the contoured metal frame. As a result, the contoured metal frame 100, reinforces the plastic inlet connector 44 to increase the amount of lateral force the plastic inlet connector can withstand. The contoured metal frame 100 also protects the threaded connector 92 on the plastic inlet connector 44 and the gripper nut 52. The contoured metal frame 100 when installed leaves a portion of the gripper nut 52 exposed, so an installer's fingers can be used to tighten the gripper nut 52. The contoured metal frame 100 also protects the appliance inlet water valve 40 from impact damage that can occur when an appliance is installed or moved in a manner similar to the metal frame 48.

Figure 13:
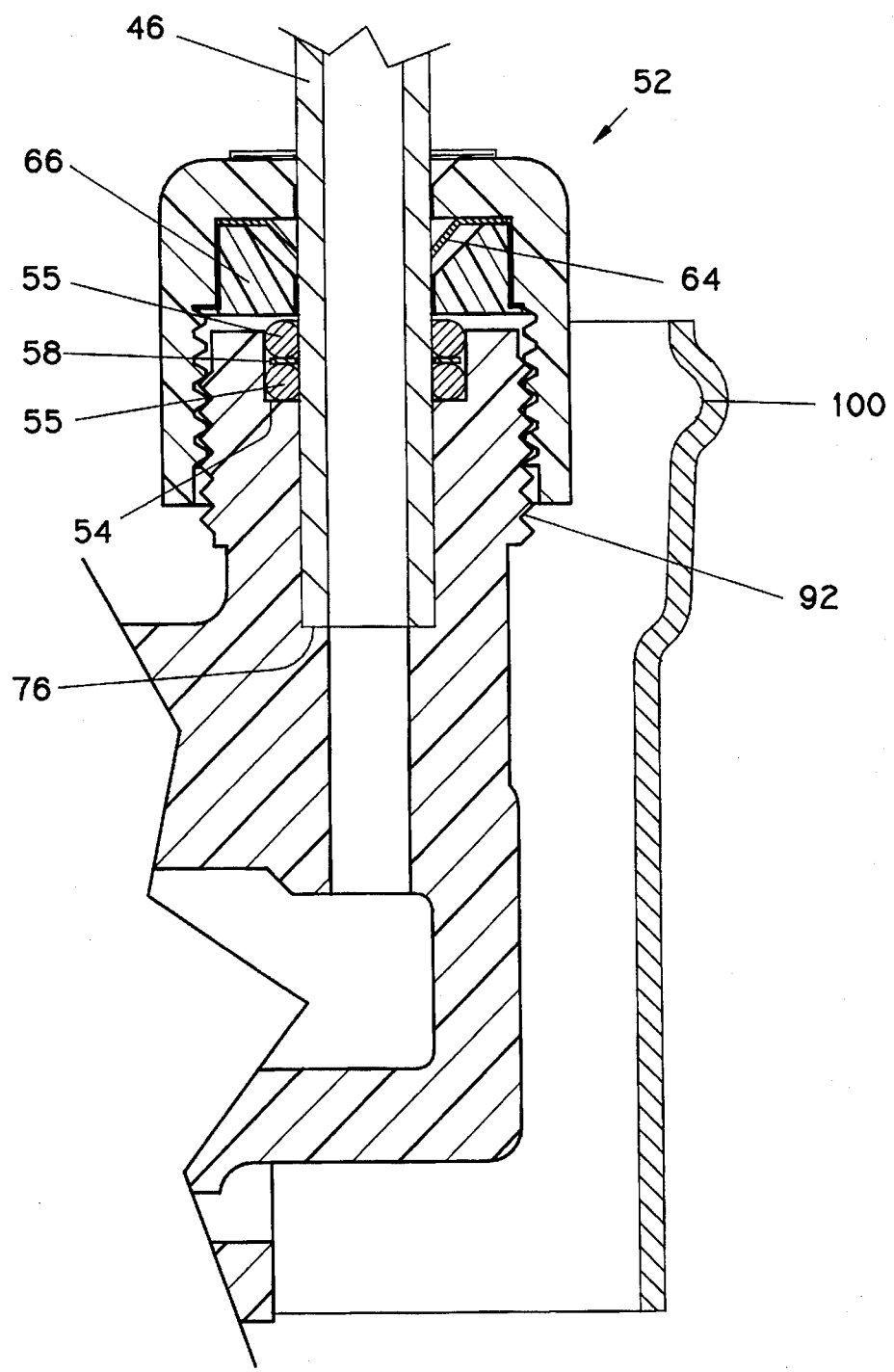
FIG. 13 shows a gripper nut with water source pipe engaging the plastic inlet connector.
Figure 20:
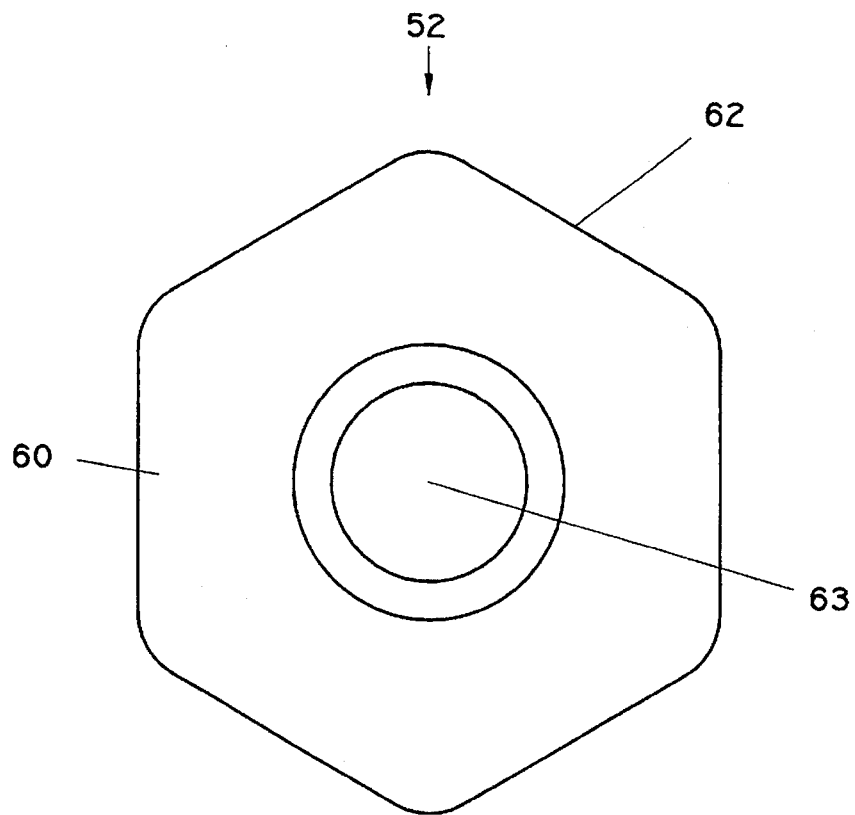
FIG. 20 shows a gripper nut with a bore.
Figure 21:
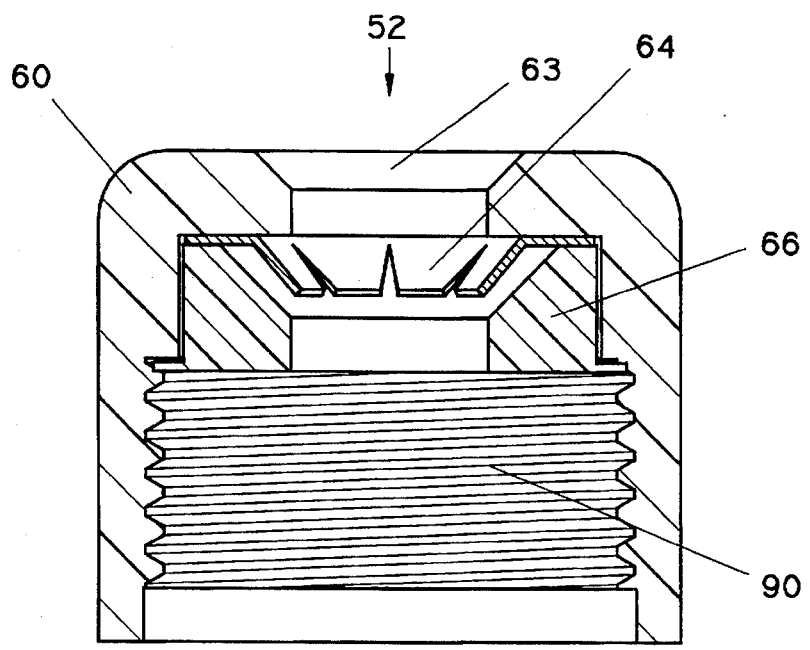
FIG. 21 shows a cross section of the gripper nut with a compression ring and a gripper.
Figure 22A:
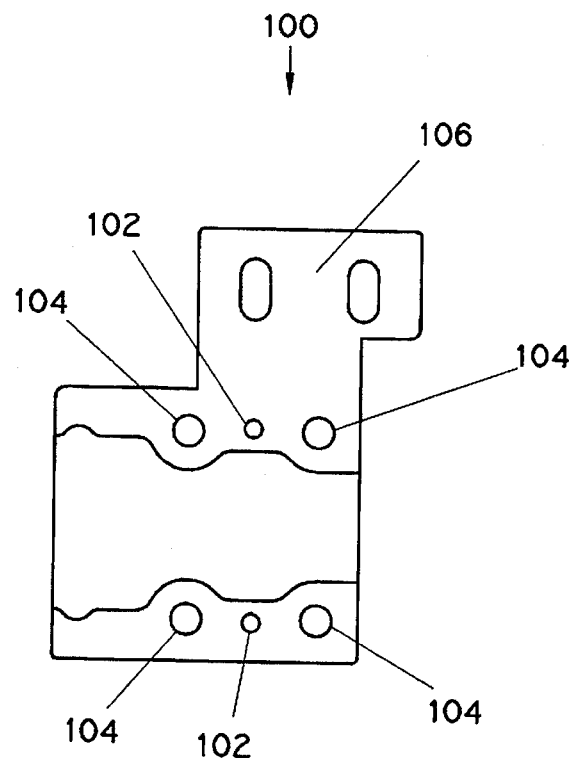
FIG. 22A–C shows a contoured metal frame.
Figure 22B:
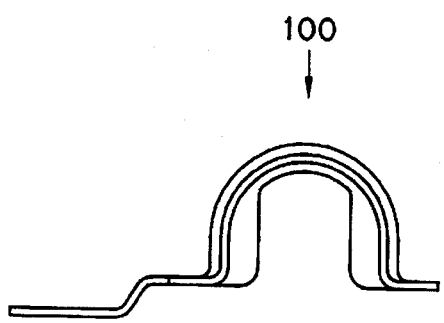
Figure 22C:
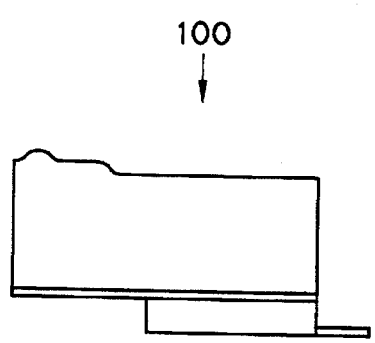
Figure 23:
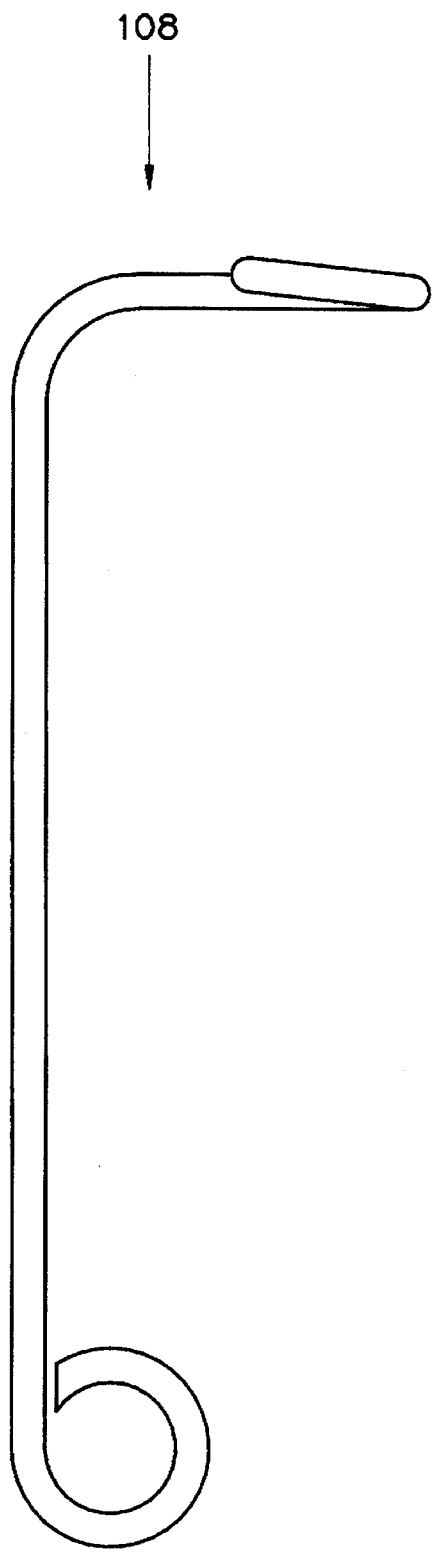
FIG. 23 shows a ground wire.

Referring to FIGS. 13, 20 and 21, the gripper nut 52 comprises a plastic nut 60 with indentations 62 for hand tightening; a bore 63 allowing communication of the water source pipe 46 into the plastic inlet connector 44, a gripper 64 for engaging the water source pipe 46 to prevent the water source pipe 46 from slipping out of the plastic inlet connector 44; and, a compression ring 66 to compress the O-rings 55 when the gripper nut 52 is tightened, thus forming a water-tight seal between the water source pipe and the inlet connector 44. The gripper nut 52 is made of a plastic. The bore 63 of the gripper nut is designed to accept a 0.25 inch (0.635 cm) diameter pipe. If a larger or smaller water source pipe 46 will be used, a larger or smaller gripper nut 52 will also be required. The plastic nut has indentations 62 for hand tightening. The indentations 62 in the gripper nut 52 can take a wide variety of forms including a standard hex head nut. The torque required to install the gripper nut 52 can be provided by a bare hand, the indentation 62 need only be fashioned to provide some friction between the gripper nut 52 and a bare hand, so the gripper nut 52 can be installed even when wet and slick. After hand tightening, it is recommended that the gripper nut 52 be turned an additional one-half turn with a wrench. This additional one-half turn of the gripper nut 52 with a wrench insures that an installer with weak hands has properly tightened the gripper nut 52. The use of the gripper nut 52 permits the water source pipe 46 to be installed with minimal tool use which is an advantage because water source lines 46 are often connected to inlet water valve 40 in a cramped, poorly lit space where tools can be difficult to use.

Referring to FIGS. 13–21, the compression ring 66 is a polypropylene material and comprises a gripper seat 68, an outer wall 69, an inner wall 70, a base 71, and tabs 72. The gripper seat 68 is donut shaped with a funneled center that has a 45 degree slope. The gripper seat 68 holds the gripper 64 in its proper place in the gripper nut 52. The outer wall 69 is circular in shape with a diameter of 0.546 inches (1.387 cm). The inner wall 70 is also circular in shape with a diameter of 0.260 inches (0.660 cm). The base 71 of the compression ring 66 is donut shaped, substantially perpendicular to the inner wall 70 and the outer wall 69. The tabs 72 are connected on the compression ring 66 where the outer wall 69 touches the base 71, and serve to interact with the gripper nut threads 90 to hold the compression ring 66 and the gripper 64 in the gripper nut 52. The tabs 72 comprise a first tab and a second tab. The tabs 72 are 0.012 inches (0.030 cm) thick, extend about 0.040 inches (0.102 cm) beyond the base 71 of the compression ring 66, and are located 180 degrees apart from each other. An alternative embodiment of the compression ring 66 is to change its structure to make it an integral part of the gripper nut, such as making the compression ring one molded piece with the gripper nut.

The gripper 64 is held in the gripper seat 68 of the compression ring and engages the water source pipe 46 to prevent the water source pipe 46 from slipping out of the plastic inlet connector 44. Alternative embodiments of the invention could provide the gripper in other areas of the water valve such as in an orifice 50. The gripper 64 can be made of a variety of materials such as plastic for use on plastic tubing or stainless steel for use on a hard, smooth water source pipe 46 such as one made of copper. The gripper 64 cooperates with the compression ring 66 to hold the water source pipe in the plastic inlet connector 44. The gripper 64 is angled so if the water source pipe 46 is pulled away from the plastic inlet connector 44 then the gripper 64 will engage the water source pipe 46 with greater pressure to create more resistance for preventing the water source pipe 46 from being pulled away from the plastic inlet connector 44. The gripper 64 is capable of holding the water source pipe in the plastic connector when over one hundred pounds (45.36 Kg) of vertical force is applied to the water source pipe.

Referring to FIGS. 5–12, the plastic inlet connector 44 is attached to the valve body inlet 74 for receiving the water inlet pipe 46 (FIG. 12) and comprises an inlet orifice 50, an O-ring seat 54 that is integral to the plastic inlet connector 44, an internal shoulder 76 that is also integral to the plastic inlet connector 44, an alignment collar 78, and alignment bosses 80. The plastic inlet connector 44 is a one-piece molded part made preferably of an FDA grade polypropylene and includes a gasket typically made of rubber to create a water-tight seal when the inlet connector 44 is attached to the inlet 74. The inlet orifice 50 communicates with the inlet 74 and can be manufactured in a variety of angles to the inlet 74 to permit the water source pipe 46 to connect more directly with less bends to the plastic inlet connector 44. The O-ring seat 54 is located 0.130 inches (0.330 cm) into the inlet orifice 50, and is designed to provide a surface for the O-rings 55 to rest on. The alignment bosses 80 are used to provide alignment for a mounting bracket.

The plastic inlet connector 44 can be attached to the inlet 74 in a variety of methods. The plastic inlet connector 44 can be attached to the inlet 74 with self-tapping screws 84 with a gasket placed between the inlet connector 44 and the inlet 74 to create a seal. Self-tapping screw relief cavities 86 are provided in the plastic inlet connector 44, so when the plastic inlet connector 44 is attached to the inlet 74 self-tapping displacement (not shown) from the inlet 74 can expand into the relief cavity 86. The purpose for a relief cavity 86 is to ensure that the plastic inlet connector 44 seats firmly against the inlet 74 to prevent leakage.

Figure 10:
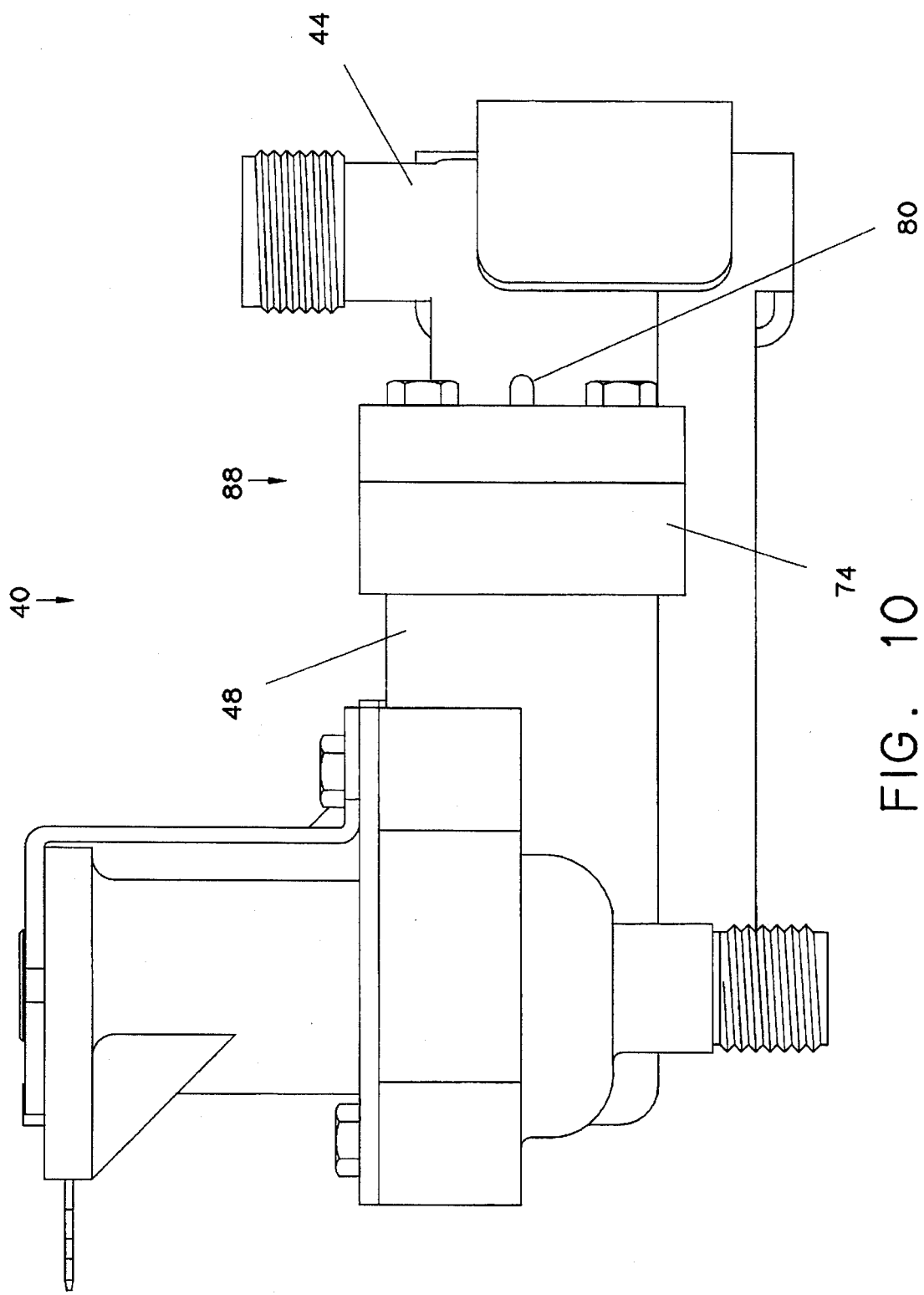
FIG. 10 shows an inlet water valve with a plastic inlet connector attached to a valve body inlet with a weldment.

Referring to FIG. 10, the plastic inlet connector 44 can also be attached to the inlet 74 with a weldment 88 that uses no screws or gasket. The weldment 88 is formed by rotating or vibrating either or both the inlet connector 44 and the valve body 48 to melt the mating surfaces on the inlet connector 44 and inlet 74 to form a seal.

Figure 14:
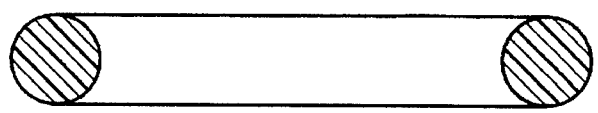
FIG. 14 shows a cross section of an O-ring.
Figure 15:
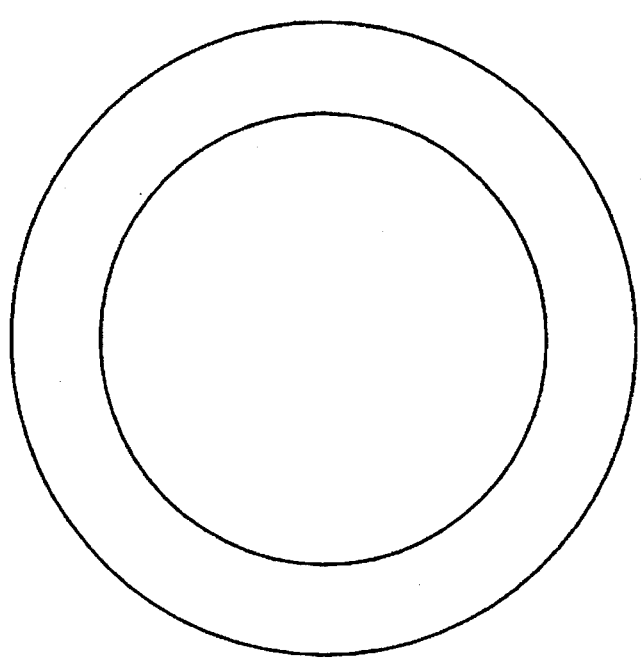
FIG. 15 shows another view of the O-ring.
Figure 16:
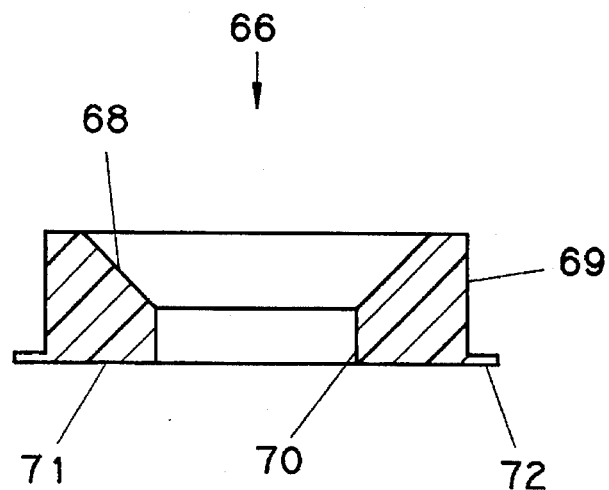
FIG. 16 shows a cross section of a compression ring.
Figure 17:
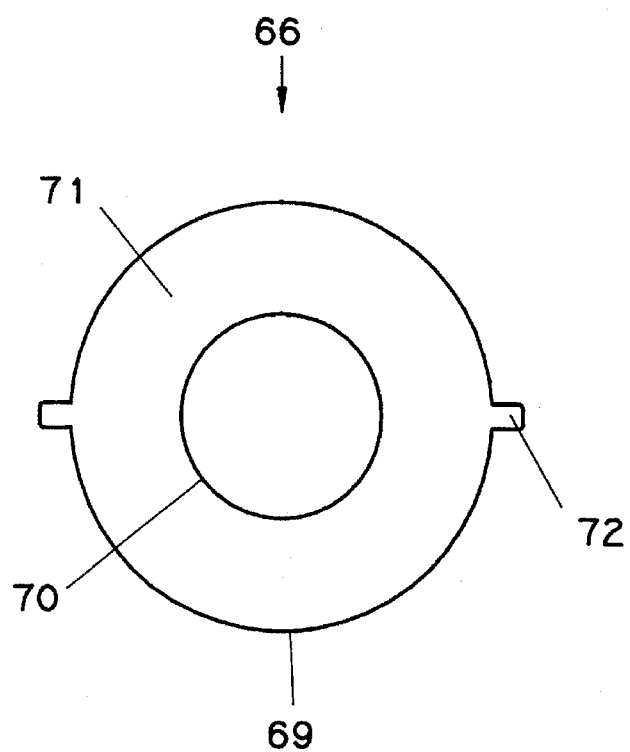
FIG. 17 shows another view of the compression ring.
Figure 18:
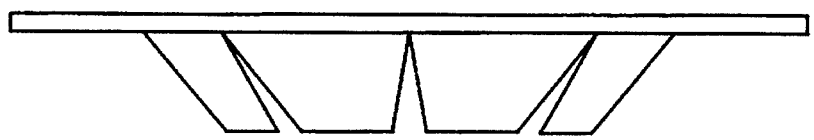
FIG. 18 shows a gripper.
Figure 19:
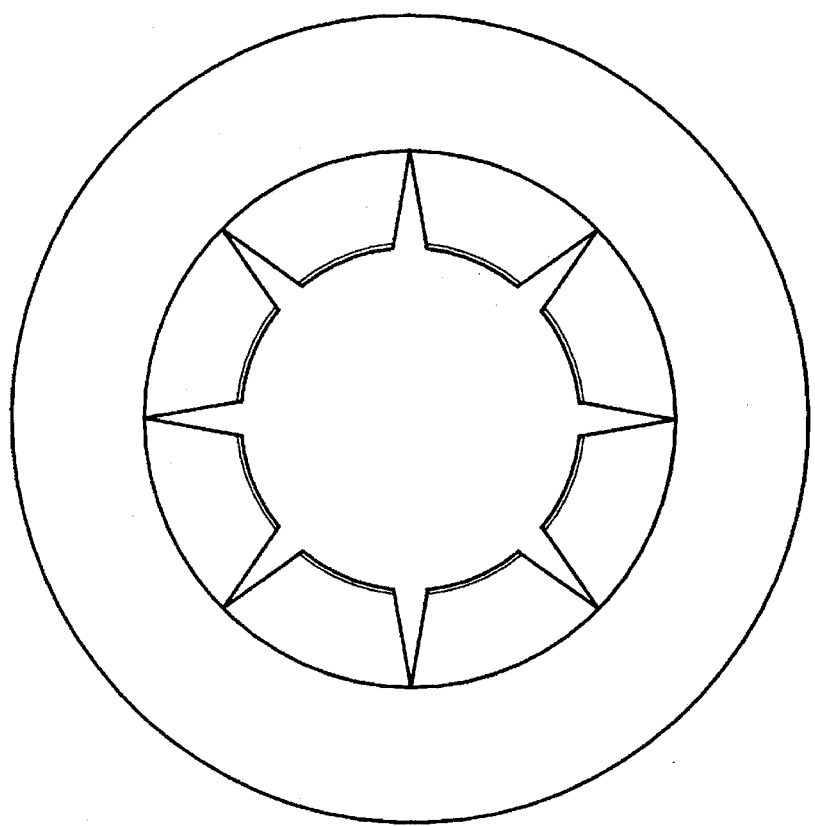
FIG. 19 shows another view of the gripper.

Referring to FIGS. 13–15, two O-rings 55 sit in the O-ring seat 54. The O-rings 55 comprise an upper O-ring and a lower O-ring. The lower O-ring sits in the O-ring seat 54, the washer 58 rests on the lower O-ring, and the upper O-ring rests on the washer 58 such that the two O-rings are separated by the washer. The washer 58 is 0.010 inches thick, manufactured from 300 series stainless steel, and has an outside diameter of 0.355 inches (0.902 cm) and an inside diameter of 0.260 inches (0.660 cm). Each O-ring is manufactured from FDA tasteless/odorless 560 Y.H.E.P, has an inside diameter of 0.237 inches (0.602 cm), and is 0.070 inches (0.178 cm) thick. The washer 58 separates the O-rings 55 and prevents the O-rings from rolling over each other when the water source pipe is inserted through the O-rings. The washer 58 also assists compression of the O-rings 55 against the water source pipe and the inlet orifice 50 by confining the compression space of the O-rings 55 and preventing the O-rings from compressing against each other. Although the present embodiment of the invention contains two O-rings 55 separated by a washer 58, an alternative embodiment could make use of only a single O-ring to provide a seal between the inlet orifice 50 and the water source pipe.

Figure 11:
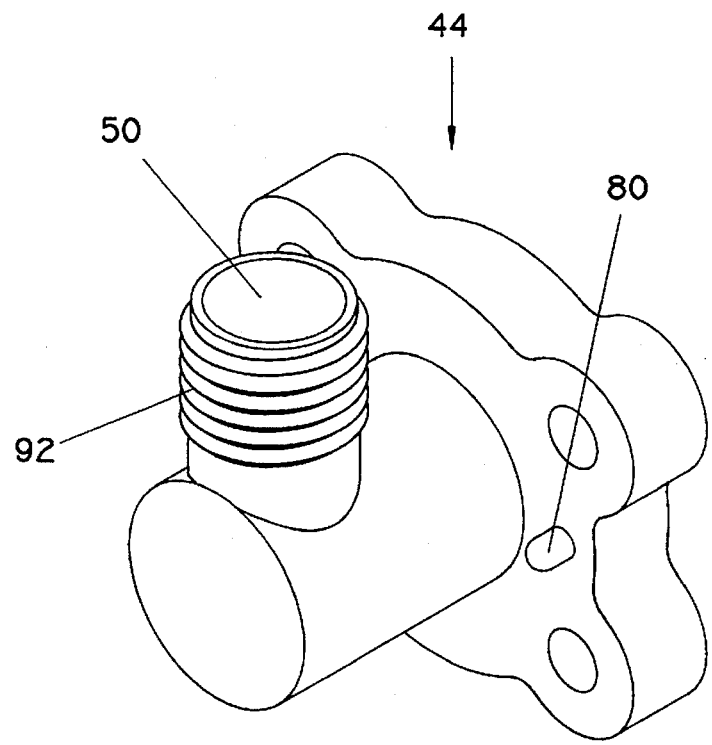
FIG. 11 shows an exterior isometric view of the plastic inlet connector.
Figure 12:
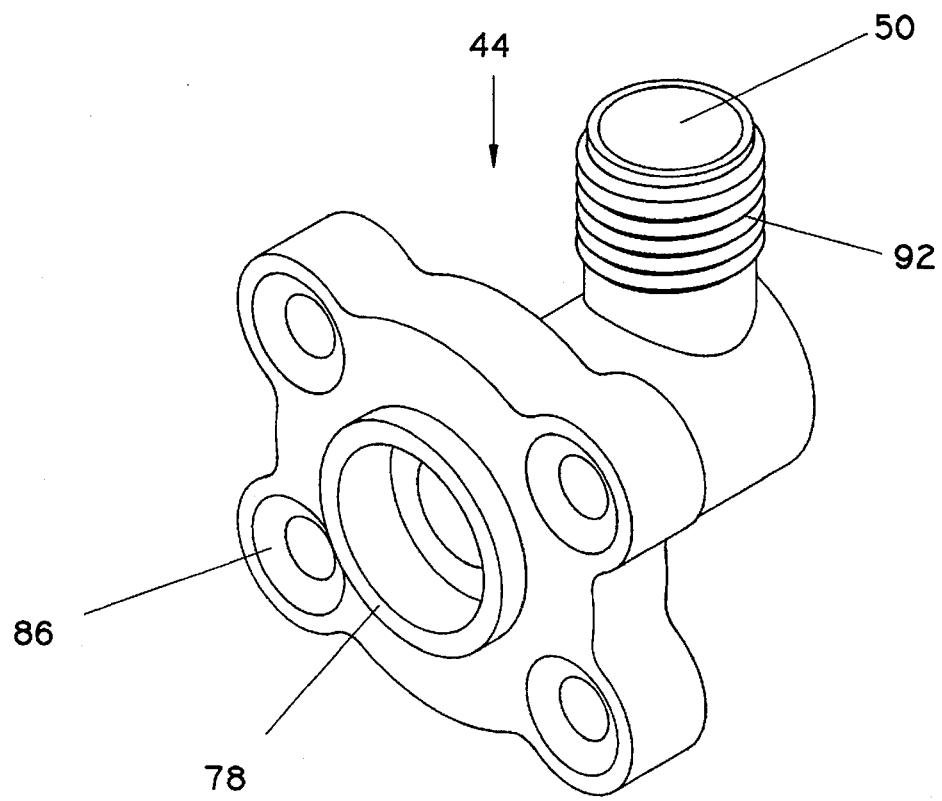
FIG. 12 shows an isometric view of the plastic inlet connector from an angle that attaches to the water valve inlet.

Operation of the invention follows. Referring to FIGS. 11–13, the gripper nut threads 90 are engaged with the threaded connector 92 surrounding the inlet orifice 50. It is an advantage of the invention that the water source pipe 46 can be connected directly to the plastic inlet connector 44 without the use of a union connector (not shown). The gripper nut 52 is installed by attaching the gripper nut 52 to the threaded connector 92 without having the compression ring 66 apply significant pressure to the O-rings 55. Before installation the water source pipe 46 should be cut with pipe shears. This will reduce the burrs on open pipe edges and reduce the chance of the burrs cutting the O-rings 55 as the pipe is fitted through the O-rings. After being cut with pipe shears, the water source pipe 46 is inserted through the gripper nut bore 63 (FIG. 21), into the inlet orifice 50, and through the O-rings 55 until the water source pipe 46 rests on the shoulder 76 on a downstream end of the inlet orifice 50. Since the plastic inlet connector 44 can be configured at a 30-90 degree angle relative to the inlet 74, the water source pipe 46 can be attached to the plastic inlet connector 44 without making a sharp bend. Sharp bends in the water source pipe 46 can create cavitation and thus noise. The gripper nut 52 is tightened causing the compression ring 66 to compress the O-rings 55. As the O-rings 55 are compressed, a seal is formed between the inlet orifice 50 and the water source pipe 46. Finally the water source pipe 46 is gripped with the gripper 64 that is angled to wedge the water source pipe 46 in the inlet orifice 50. The operational steps described above could be done in a different order. For instance the water source pipe 46 could be inserted through the gripper nut bore 63 prior to engaging the gripper nut threads 90 on the inlet connector 44. The gripper nut operates so that as the gripper nut is being tightened, the sealing and gripping functions can occur simultaneously.

The previously described versions of the present invention have many advantages, including: Meeting anticipated requirements to eliminate parts containing lead that contact potable water by providing an all plastic inlet 24 that eliminates the need for brass fittings which can contain lead. Decreasing the manufacturing costs and increase quality by reducing the number of manufactured parts required to produce an appliance inlet water valve 40. Creating an easier to install appliance inlet water valve 40 that requires minimal use of tools to attach the water source pipe 46 to the inlet connector 44. Eliminating leaks caused by garden hose connector broken solder joints on appliance inlet water valves 30P by eliminating garden hose connectors. Decreasing water source pipe 46 kinks and obstructions by having the inlet connector 44 make up to a 90 degree bend rather than the bending the water source pipe 46. Decreasing water inlet noise caused by cavitation. Eliminating leakage that can occur around a brass insert or brass insert gasket in the inlet connector 44 by eliminating the need for a brass insert.

Although the present invention has been described in considerable detail with reference to certain preferred versions thereof, other versions are possible. For example the plastic inlet connector 44 could be configured to accept a water source pipe 26 from any direction. A gripper nut 52 could be attached to the plastic inlet connector 24 with captive threads, so when connecting the water source pipe 46 up to the plastic inlet connector 44 the gripper nut 52 could not be dropped or fall off the inlet connector 44.

What is claimed is:

1. An appliance water valve, comprising:
   (a) a water source pipe supplying water to an appliance;
   (b) a valve body having a plastic inlet integral to the valve body controlling the input of water from the water source pipe to the appliance; and,
   (c) a plastic inlet connector attached to the inlet for receiving the water source pipe wherein the plastic inlet connector comprises:
      (1) an internal connector cavity with an integral internal O-ring seat that receives the water source pipe,
      (2) at least one O-ring that sits in the O-ring seat; and
      (3) a gripper nut that is placed over the water source pipe, the gripper nut having a compression ring that compresses the O-ring against the water source pipe and the plastic inlet connector to secure the water source pipe in the internal connector cavity with a water-tight seal.

2. The appliance water valve as recited in claim 1 wherein the plastic inlet connector, further comprises: an internal shoulder that is integral to the plastic inlet connector for properly positioning the water source pipe.

3. The appliance water valve as recited in claim 1, further comprising a metal frame for attaching the valve body to the appliance wherein the frame is shaped around the plastic inlet connector to protect the plastic inlet connector from damage.

4. The appliance water valve as recited in claim 3 wherein the metal frame protects the plastic inlet connector from damage by providing support to the plastic inlet connector when a lateral force is applied to a water source pipe attached to the plastic inlet connector.

5. The appliance water valve as recited in claim 1 wherein the appliance is a refrigerator ice maker.

6. The appliance water valve as recited in claim 1 wherein the plastic inlet connector is at about 90 degrees relative to the inlet.

7. The appliance water valve as recited in claim 1 wherein the plastic inlet connector is a single integral piece.

8. The appliance water valve as recited in claim 1 wherein the plastic inlet connector further comprises alignment bosses for providing alignment for a mounting bracket.

9. The appliance water valve as recited in claim 1 wherein the water inlet pipe is plastic.

10. The appliance water valve as recited in claim 1 wherein the plastic inlet connector, further comprises an alignment collar for aligning the plastic inlet connector with the inlet during assembly.

11. The appliance water valve as recited in claim 1 wherein the plastic inlet connector is attached to the inlet with screws.

12. The appliance water valve as recited in claim 11 wherein the screws are self-tapping and the plastic inlet has a thread relief cavity.

13. The appliance water valve as recited in claim 1 wherein the plastic inlet connector is attached to the inlet with a weldment.

14. The appliance water valve as recited in claim 1 wherein the gripper nut, further comprises indentations for hand tightening.

15. The appliance water valve as recited in claim 14 wherein the gripper is stainless steel.

16. The appliance water valve as recited in claim 1 wherein the water source pipe is retained in the plastic inlet connector with a gripper.

17. The appliance water valve as recited in claim 1 wherein two O-rings sit in the O-ring seat and a washer is placed in between the O-rings.

18. The appliance water valve as recited in claim 1 wherein the gripper nut further comprises a gripper for engaging the water source pipe to prevent the water source pipe from slipping out of the plastic inlet connector.

19. A method of attaching a water inlet pipe to an appliance water valve, comprising the steps of:
   (a) providing a water source pipe to the appliance water valve;
   (b) providing a plastic inlet connector attached to a water valve body having an inlet orifice for receiving the water source pipe, a threaded connector surrounding the inlet orifice, and an O-ring seat within the plastic inlet connector;
   (c) providing a gripper nut having a compression ring, and threads that cooperate with the threaded receptacle for attaching the gripper nut to the plastic inlet connector and a nut bore sized to accept the water source pipe;

(d) engaging the gripper nut threads with the threaded connector surrounding the inlet orifice;

(e) inserting the water source pipe through the gripper nut bore, into the inlet orifice, and through an O-ring until the water source pipe rests on a shoulder on a downstream end of the inlet orifice;

(f) tightening the gripper nut causing the compression ring to compress the O-ring located on the O-ring seat.

20. The method as recited in claim 19 wherein the plastic inlet connector, the inlet orifice, the threaded connector surrounding the inlet orifice, and O-ring seat are a single molded plastic piece.

21. The method as recited in claim 19 wherein the gripper nut is tightened by hand.

22. The method as recited in claim 19 wherein the compression ring is plastic.

23. The method as recited in claim 19 wherein step (c) further comprises providing a gripper that cooperates with the gripper nut for wedging the water source pipe in the inlet orifice.

\* \* \* \* \*